United States Patent
Morrow

(10) Patent No.: US 7,444,501 B2
(45) Date of Patent: Oct. 28, 2008

(54) METHODS AND APPARATUS FOR RECOGNIZING A SUBROUTINE CALL

(75) Inventor: Michael William Morrow, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 11/563,943

(22) Filed: Nov. 28, 2006

(65) Prior Publication Data

US 2008/0126770 A1    May 29, 2008

(51) Int. Cl.
G06F 9/40 (2006.01)
(52) U.S. Cl. ................................ 712/243; 712/242
(58) Field of Classification Search ............... 712/242, 712/243
See application file for complete search history.

(56) References Cited

U.S. PATENT DOCUMENTS

| | | | | |
|---|---|---|---|---|
| 4,831,517 A | * | 5/1989 | Crouse et al. ................ 714/8 |
| 5,974,543 A | * | 10/1999 | Hilgendorf et al. .......... 712/240 |
| 6,898,698 B1 | * | 5/2005 | Sunayama et al. .......... 712/233 |
| 6,973,563 B1 | * | 12/2005 | Sander ....................... 712/242 |
| 2008/0059780 A1 | * | 3/2003 | Stempel et al. ............. 712/242 |
| 2003/0097549 A1 | * | 5/2003 | Ukai et al. .................. 712/240 |
| 2006/0253686 A1 | * | 11/2006 | Suzuki ....................... 712/207 |

* cited by examiner

Primary Examiner—William M Treat
(74) Attorney, Agent, or Firm—Nicholas J. Pauley; Joseph B. Agusta; Thomas Rouse

(57) ABSTRACT

An apparatus for recognizing a subroutine call is disclosed. The apparatus includes a circuit comprising a first input for receiving contents of a register, a second input for receiving a non-sequential change in program flow, and a third input for receiving the next sequential address after the non-sequential change in program flow. The circuit is configured to compare the next sequential address and the contents of the register to determine whether the non-sequential change in program flow is a subroutine call.

20 Claims, 4 Drawing Sheets

| | IFU | DCD | IQ | RACC | EXE | IsCallFlag | LR | LS Struct |
|---|---|---|---|---|---|---|---|---|
| | 210A | 210B | 210C | 210D | 210E | 210F | 210G | 210H |
| 1 | LDR | | | | | | | — |
| 2 | ADD | LDR | | | | | | — |
| 3 | SUB | ADD | LDR | | | | | — |
| 4 | BR | SUB | ADD | LDR | | | | — |
| 5 | INSTR$_A$ | BR ↶ 215 | SUB | ADD | LDR ↙ 205 | | | — |
| 6 | ADD | | BR | SUB | ADD | | | — |
| 7 | SUB | ADD | | BR | SUB | | RA ↗ 220 | — |
| 8 | MOV | SUB | ADD | | BR ↶ 225 | SET ↶ 230 | RA | RA |
| 9 | BX | MOV | SUB | ADD | ADD | | RA | RA |
| 10 | INSTR$_A$ ↙ 235 | BX ↖ 240 | MOV | SUB | SUB | | RA | — |
| 11 | | | BX | MOV | MOV | | RA | — |
| ... | | | | | BX | | | — |
| n | BR | | | | | | | — |
| n+1 | INSTR$_A$ | BR | | | | | | — |
| n+2 | ADD | | BR | | | | 245 | RA |

FIG. 2

METHODS AND APPARATUS FOR RECOGNIZING A SUBROUTINE CALL

FIELD OF THE INVENTION

The present invention relates generally to the field of pipelined processors and, in particular, to a method of recognizing subroutine call in order to reduce power and increase utilization of the pipelined processor.

BACKGROUND

Microprocessors perform computational tasks in a wide variety of applications. Improved processor performance is almost always desirable, to allow for faster operation and/or increased functionality through software changes. In many embedded applications, such as portable electronic devices, conserving power is also an important goal in processor design and implementation.

Many modern processors employ a pipelined architecture, where sequential instructions are overlapped in execution to increase overall processor throughput. Maintaining smooth execution through the pipeline helps achieve high performance. Most modern processors also utilize a hierarchical memory, with fast, on-chip cache memories storing local copies of recently accessed data and instructions.

Real-world programs include indirect branch instructions, the actual branching behavior of which is not known until the instruction is actually evaluated deep in the execution pipeline. Most modern processors employ some form of branch prediction, whereby the branching behavior of indirect branch instructions is predicted early in the pipeline, such as during a fetch or decode pipe stage. Utilizing a branch prediction technique, the processor speculatively fetches the target of the indirect branch instruction and redirects the pipeline to begin processing the speculatively fetched instructions. When the actual branch target is determined in a later pipe stage such as an execution pipe stage, if the branch was mispredicted, the speculatively fetched instructions must be flushed from the pipeline, and new instructions fetched from the correct target address. Prefetching instructions in response to an erroneous branch target prediction adversely impacts processor performance and power consumption.

One example of indirect branch instructions includes branch instructions utilized to return from a subroutine. For example, a return call from a subroutine may include a branch instruction whose return address is defined by the contents of a register. A return address defines the next instruction to be fetched after the subroutine completes and is commonly the instruction after a branch instruction from which the subroutine was originally called. Many high-performance architectures designate a particular general purpose register for use in subroutine returns, commonly referred to as a link register.

For convenience, a return call may also be referred to as a branch return instruction. In order for a processor pipeline to utilize branch prediction for a branch return instruction, conventional software includes an explicit subroutine call such as a branch and link instruction to record the return address into the link register. Many high performance implementations include a link stack structure at the decode stage of processing the branch and link instruction. Link return values are pushed onto this stack, in order to allow for accurate branch prediction when the corresponding subroutines return. Conventional link stack structures contain a list of return addresses in order to support multiple subroutine calls flowing through a pipeline and to support the nesting of multiple levels of subroutine calls. Subsequently, when the branch return instruction within the subroutine is being decoded, the return address is read from the link stack structure to be utilized in branch prediction to predict the target address if other branch prediction hardware dictates that the processor should redirect the pipeline. If the predicted result indicates to redirect the pipeline, the pipeline begins fetching instructions from the return address that was read from the link stack structure.

However, there exists many compilers and legacy code which do not generate or incorporate conventional branch and link instructions when calling a subroutine. Therefore, in those situations, the link stack structure is not utilized resulting in the integrity of the link stack structure to be compromised. For example, the conventional popping of a return address from the link stack structure may not correlate to the return instruction which stimulated the popping of the return address in the first place. One effect of a compromised link stack structure includes increased mispredictions on return instructions. Furthermore, in those situations where a subroutine call is not recognized in a program segment, the problem is compounded because branch prediction hardware may not be utilized to populate the link stack structure on subsequent unrecognizable subroutine calls. By way of example, refer to the following table containing a code segment which would run on an ARM Ltd. compatible processor:

TABLE 1

| Code Segment. | |
|---|---|
| 0x00899808 | LDR LR, 0x00899818 |
| 0x0089980C | ADD |
| 0x00899810 | SUB |
| 0x00899814 | BR 0x00990000 |
| 0x00899818 | $INSTR_A$ |
| 0x0089981C | $INSTR_B$ |
| ... | |
| 0x00990000 | ADD |
| 0x00990004 | SUB |
| 0x00990008 | MOV |
| 0x0099000C | BX LR |

The program flow of the code segment in Table 1 includes processing the instructions in sequential order starting at address 0x00899808 and through to address 0x00899814. At address 0x00899814, a branch instruction changes the program flow so that the next instruction processed is located at address 0x00990000, the start of a subroutine.

The combination of setting the link register (i.e. LDR LR, 0-00899818) and the branch instruction (i.e. BR) prepare the processor for a subsequent branch to a subroutine. In this example, the actual subroutine to which the call is made begins at address 0x00990000 and ends at address 0x0099000C. The LDR LR, 0x00899818 instruction indicates that address 0x00899818 should be copied into a link register (LR) resulting in storing the return address, address 0x00899818, into the link register. At the end of the subroutine, the return address is retrieved from the link register. More specifically, the return address is retrieved when executing BX LR, the branch return instruction. Other code segments which imply a subroutine call exist and include instructions which modify the link register such as the sequential combination of instructions MOV LR, PC BR [A] where [A] is the address of the beginning of a subroutine.

SUMMARY

The present disclosure recognizes the pervasiveness of such legacy software, compilers that produce code segments having two or more instructions which correspond to a subroutine call, and the cost involved in re-writing legacy software to utilize conventional branch and link instructions when calling a subroutine. Furthermore the present disclosure recognizes a need for microprocessors developed today to recognize instruction sequences which imply a subroutine call in order to utilize a link stack structure and effectively predict the return address when a branch return instruction.

According to one embodiment, a method of recognizing a subroutine call is provided. The method includes detecting a non-sequential change in program flow, retrieving a next sequential address after the detected non-sequential change in program flow, and comparing the next sequential address with the contents of a register to determine whether the non-sequential change is a subroutine call.

Another embodiment relates to an apparatus for recognizing a subroutine call. The apparatus includes a circuit having three inputs. The first input is configured to receive contents of a register. The second input is configured to receive a non-sequential change in program flow. The third input is configured to receive the next sequential address after the non-sequential change in program flow. The circuit is configured to compare the next sequential address and the contents of the register to determine whether the non-sequential change in program flow is a subroutine call.

According to yet another embodiment, another apparatus is disclosed. The apparatus comprises a processor pipeline for processing instructions and a circuit coupled thereto. The circuit is configured to receive contents of a register, an indication of a non-sequential change in program flow, and the next sequential address after the indication of the non-sequential change in program flow. The circuit is also configured to compare the contents of the link register with the next sequential address to determine whether the indication of a non-sequential change in program flow is a subroutine call.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

BRIEF DESCRIPTION OF THE DRAWINGS

FIG. 2 is a timing diagram which follows an exemplary flow of instructions through the pipeline illustrated in FIG. 1.

DETAILED DESCRIPTION

Figure 1:
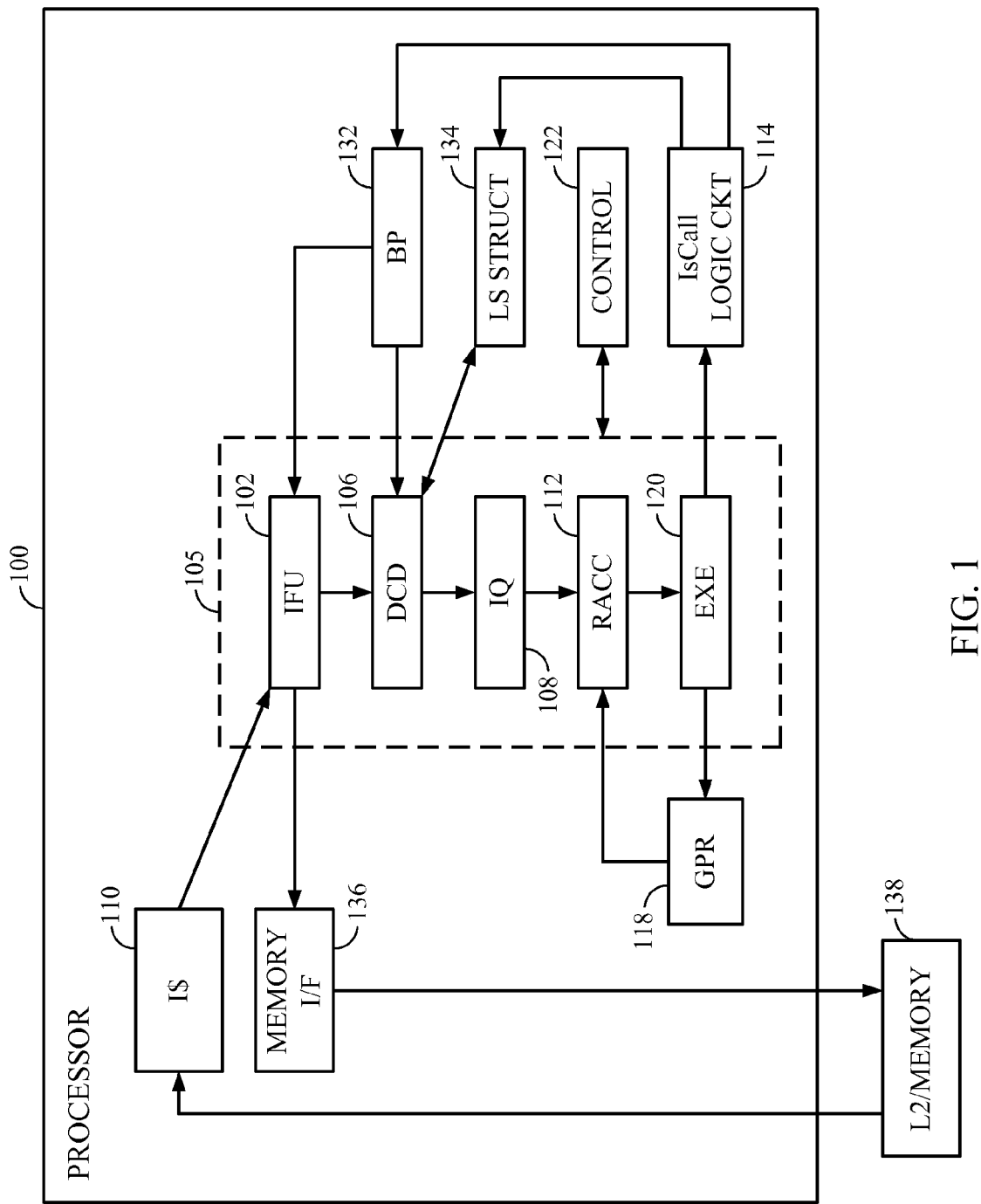
FIG. 1 is a functional block diagram of a processor.

FIG. 1 depicts a functional block diagram of a processor 100 in which aspects of the present invention may be employed. The processor 100 includes an instruction cache (I-cache) 110 for caching recently processed instructions and a memory interface 136 for accessing memory 138 when an instruction is not found in I-cache 110. Memory 138 may be located on or off the processor 100 and may comprise a layer 2 (L2) memory component.

The processor 100 also includes an instruction pipeline 105 for processing instructions and a branch prediction circuit 132 for predicting a target address for an indirect branch instruction and predicting whether to redirect instruction pipeline 105 to process the target address. If the branch prediction circuit 132 predicts to redirect the instruction pipeline 105, the indirect branch instruction is said to have been "predicted taken." If the indirect branch instruction has been "predicted taken," the branch prediction circuit 132 predicts a target address of the indirect branch instruction and redirects the instruction pipeline 105 to begin fetching instructions at the target address.

The processor 100 processes instructions in an instruction pipeline 105 according to control logic circuit 122. In some embodiments, the pipeline 105 may be a superscalar design having two or more parallel pipelines. The pipeline 105 includes various pipe stages: an instruction fetch unit (IFU) stage 102, a decode (DCD) stage 106, an instruction queue (IQ) stage 108, a register access (RACC) stage 112, and an execution stage (EXE) 120. In some embodiments, a pipe stage may process a single instruction at a time. In another embodiment, a pipe stage may concurrently process two or more instructions at a time. It should be noted that pipe stages may be added to or subtracted from pipeline 105 without limiting the scope of the present disclosure. The processor 100 also includes a General Purpose Register (GPR) file 118 which includes registers that, through microarchitectural convention, are accessible by pipe stages 112 and 120.

The instruction fetch unit (IFU) stage 102 attempts to retrieve an instruction from in I-cache 110. If an instruction address is not found in I-cache 110, the instruction fetch unit (IFU) stage 102 initiates a request to retrieve the corresponding instruction from memory 138. The decode stage 106 fully decodes an instruction. Furthermore, in addition to conventional functions performed at a decode stage, decode stage 106 recognizes conventional subroutine call instructions such as ARM Inc.'s branch and link instruction and writes a return address into a link stack structure 134. The link stack structure 134 may be a set of registers managed as a circular buffer. The return address is an address of an instruction to which pipeline 105 is to be redirected at the completion of a subroutine. On an indirect branch instruction, the decode stage 106 may invoke the branch prediction circuit 132 in order to determine whether to begin fetching instructions to pipeline 105 from a speculative target of the branch instruction.

The instruction queue stage 108 buffers one or more instructions in order to allow speculative fetching to continue during stalls, if any, of the execution pipeline. The register access stage 112 retrieves one or more operands from the general purpose register 118 as may be needed by an instruction. Execute stage (EXE) 120 includes known components such as arithmetic logic units and the like in order to execute instructions. The results produced from execute stage 120 are written to the GPR file 118. During execute stage 120, actual branch resolution takes place to determine if branch prediction made during decode stage 106 is correct. If the actual branch resolution differs from the predicted destination, a branch is said to have been mispredicted.

The execute stage 120 also invoke the IsCall logic circuit 114 to determine if a branch instruction corresponds to an implicit subroutine call. The IsCall logic circuit 114 records this result in the branch prediction (BP) circuit 132 in order for subsequent execution of the branch instruction to be interpreted as an implicit subroutine call during an earlier pipe stage such as DCD 106 or IFU 102. In one embodiment, the recorded result is a flag which is stored in the BP circuit 132 and is associated with the branch instruction. If the branch instruction is an implicit subroutine call, the IsCall logic circuit 114 updates the link stack structure 134 with the address of the instruction following the branch instruction. The IsCall logic circuit 114 will be described in more detail in connection with the discussion of FIG. 4.

Although FIG. 1 depicts the execute stage (EXE) 120 coupling to the IsCall logic circuit 114, the IsCall logic circuit 114 may alternatively be coupled to an earlier stage in the pipeline 105. In an alternative embodiment the decode stage (DCD) 106 may couple to the IsCall logic circuit 114. In this embodiment, the decode stage (DCD) 106 invokes the IsCall logic circuit 114 once it determines a BR instruction has been decoded.

Those of skill in the art will recognize that numerous variations of the processor 100 are possible. For example, the processor 100 may include a second-level (L2) cache for I-cache 110. In addition, one or more of the functional blocks depicted in the processor 100 may be omitted from a particular embodiment. Other functional blocks that may reside in the processor 100, such as a translation lookaside buffer, data cache, and the like are not germane to a description of the present invention, and are omitted for clarity.

FIG. 2 is a timing diagram 200 which follows a flow of instructions through the pipeline 105 illustrated in FIG. 1. In particular, the flow of instructions traced in timing diagram 200 is the code segment as illustrated in Table 1. For the purposes of the present disclosure, the term "implicit subroutine call" refers to a combination of two or more instructions whose combined function is to set registers preparing for a subroutine call and to call a subroutine. For example, referring to Table 1, the two instructions, LDR LR, 0x0089908 and BR 0x00990000, define an implicit subroutine call. In this case, the LDR instruction defines the beginning of the implicit subroutine call and the BR instruction defines the end of the implicit subroutine call.

Columns 210A-210E of timing diagram 200 correspond to the stages of pipeline 105. Rows 1-11 correspond to sequential timing cycles. For explanation purposes, each pipe stage processes one instruction per cycle. However, it should be recognized by one skilled in the art that the teachings of the present disclosure apply to both multiple cycle pipe stages and to pipe stages that are able to process multiple instructions per cycle.

Column 210F of timing diagram 200 corresponds to the contents of a flag named IsCallFlag which indicates whether an indirect branch instruction results in a subroutine call. Column 210G corresponds to the contents of the link register (LR). Column 210H corresponds to the contents of a link stack structure such as link stack structure 134 as a result of the IsCall logic circuit 114.

In general, instructions enter the IFU stage 210A and propagate to the next stage in the next cycle. In cycle 1, the LDR LR, 0x00899818 instruction is in the IFU stage 210A. Instructions ADD, SUB, BR, and generic instruction, $INSTR_A$, are sequentially fetched from IFU pipe stage 210A. In cycle 5, at point in time 215, decode stage 210B decodes the BR instruction and invokes branch prediction such as branch prediction circuit 132. Branch prediction predicts that the BR instruction will be taken and, thus, the pipeline 105 is redirected to sequentially fetch the subroutine instructions ADD, SUB, MOV, and BX. The subroutine comprises all the instructions beginning with the ADD instruction and ending with the BX instruction as shown in Table 1. Before redirecting the pipeline 105, $INSTR_A$ is flushed from the pipeline 105 since it was fetched prior to branch prediction. The blank cycle following the BR instruction depicts the position of the $INSTR_A$ instruction in the pipeline 105 would have taken if it had not been flushed.

From cycles 1-5, the LDR instruction propagates through pipe stages 210B-210E. In cycle 5, at point in time 205, the execute stage 210E executes the LDR instruction to load the return address 0x00899818 into the link register (LR). At point in time 220, the return address (RA) 0x00899818 is available in the link register. The return address refers to $INSTR_A$ in Table 1 meaning that at the end of executing the subroutine beginning at address 0x00990000, the flow of instruction execution should return to address 0x00899818.

At point in time 225, the execute stage 210E executes the BR instruction. The execute stage 210E validates whether the BR instruction should have been taken. The execute stage 210E also invokes the IsCall logic circuit 114 to determine whether the BR instruction is a branch to a subroutine. The phrase "branch to a subroutine" is also referred to as a subroutine call. The IsCall logic circuit 114 utilizes the next address following the BR instruction which is the address of $INSTR_A$ even though $INSTR_A$ was previously flushed from the pipeline 105. Since the address of the next instruction equals the return address stored in the link register (LR), the IsCall logic circuit 114 sets the is CallFlag 210F associated with the BR instruction and stores it with the address of the BR instruction in the branch prediction circuit 132. An exemplary branch prediction storage element will be described in connection with FIG. 3. Also, the IsCall logic circuit 114 copies the return address to the link status structure 210H at point in time 230.

The final instruction of the subroutine, BX, is decoded in cycle 10, point in time 235. Decode stage 210B recognizes the BX instruction as a return call and, thus, branch prediction 132 predicts the program flow by popping the return address (RA) off of the link status structure 210H. Decode stage 210B redirects the pipeline 105 to begin fetching from $INSTR_A$ whose address is the same as the return address (RA). See reference point 240. Also, in cycle 11, since the RA was popped (i.e. read and removed from the link status structure), the link status structure 210H no longer contains return address. Utilizing the processor of FIG. 1 as illustrated in timing diagram 200, the implicit subroutine call defined by the combined LDR and BR instructions allowed for the link status structure to store the return address.

The next time a BR instruction is processed by the pipeline 105, branch prediction circuit 132 may utilize the set IsCallFlag associated with the address of the BR instruction stored therein to populate the link status structure earlier than the first time the BR instruction was processed by pipeline 105.

At clock cycle n, the same BR instruction enters the pipeline 105 at IFU stage 210A. At clock cycle n+1, $INSTR_A$ enters the TFU stage 210A and the BR instruction is decoded by DCD stage 210B. During the DCD stage 210B, the branch prediction circuit 132 looks up the address of the BR instruction and finds that it has a corresponding IsCallFlag set indicating that the BR instruction is a subroutine call. Consequently, the DCD stage 210B pushes the next address, the address for $INSTR_A$ on to the link status structure 210H as shown at reference 245.

Figure 3:
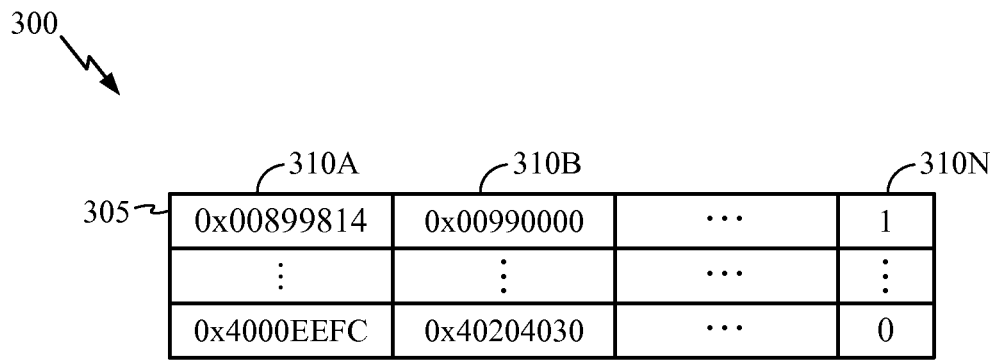
FIG. 3 is an exemplary portion of a branch target address cache (BTAC).

FIG. 3 is an exemplary portion of a branch target address cache (BTAC) 300. The BTAC 300 is suitably employed by the branch prediction circuit 132. The BTAC 300 includes at least three columns, columns 310A, 310B, and 310N. Column 310A contains addresses of branch instructions. Column 310B contains branch target addresses, the last address to which the corresponding branch instruction branched. Column 310N contains the value of the IsCallFlag. The IsCall- Flag, when set, indicates that the associated branch instruction corresponds to a subroutine call. Row 305 corresponds to the BR instruction in Table 1, where its address is 0x00899814, its target address is 0x00990000 corresponding to the ADD instruction, and its IsCallFlag is set.

Figure 4A:
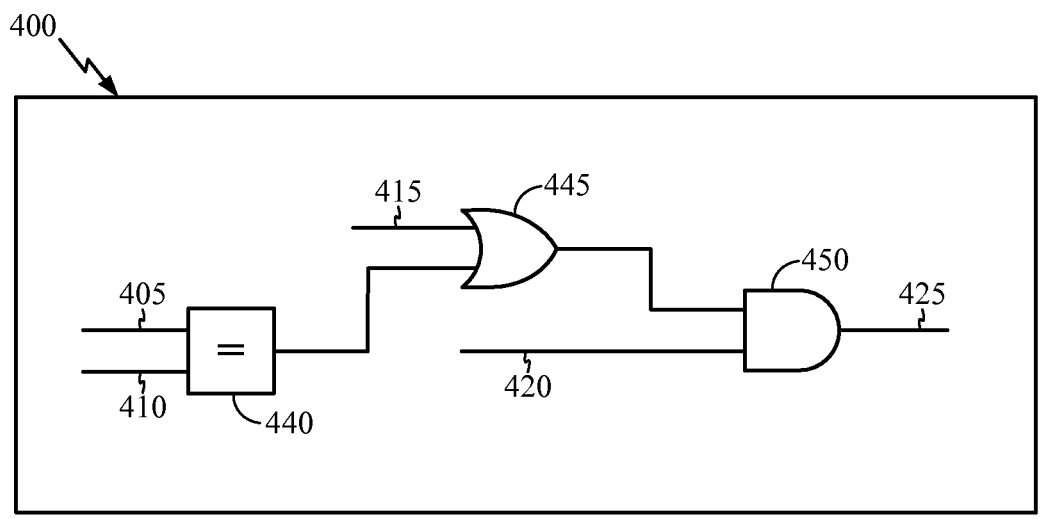
FIGS. 4A and 4B (collectively FIG. 4) are exemplary embodiments of the IsCall logic circuit illustrated in FIG. 1.
Figure 4B:
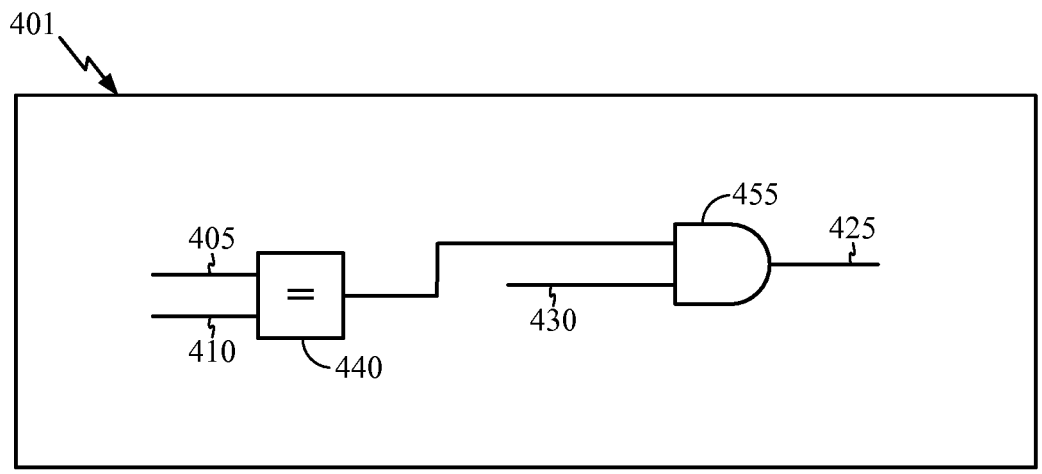

FIGS. 4A and 4B illustrate various embodiments of an IsCall logic circuit. These embodiments may be coupled to the execute pipe stage 120 as shown in FIG. 1 or any pipe earlier pipe stage. FIG. 4A is an exemplary embodiment of the IsCall logic circuit 400 which may be suitably employed in FIG. 1. The IsCall logic circuit 400 includes a comparator 440, a two port OR gate 445, and a two port AND gate 450. The comparator 440 receives two inputs; an input containing the value of the link register (LR) 405 and an input containing the next address 410. As described in FIG. 2, the next address is the next address sequentially fetched after a BR instruction. The output of comparator 440 is coupled to one port of the two port OR gate 445. The other port is coupled to a signal 415 indicating whether the current instruction in the pipe stage coupled to the IsCall logic circuit 400 is a branch and link instruction. The OR gate 445 is optional and is used in order support branch and link instructions in the same manner as implicit subroutines. The output of the OR gate 445 is coupled to one port of the two port AND gate 425. The other port is coupled to an is TakenBranch signal 420 generated by branch prediction circuit 132. The branch prediction circuit 132 generates the is TakenBranch signal 420 from the BR instruction which invoked the IsCall logic circuit 400. In a non-speculative embodiment, the EXE stage 120 may alternatively generate the is TakenBranch signal 420. When the output 425 of the IsCall logic circuit 400 is true, the output 425 is utilized to set the is CallFlag in the branch prediction circuit 132 and to copy the return address in to the link status structure. It is recognized by those skilled in the art, that other logic circuits may be utilized in the IsCall logic circuit 400 to control whether to indicate that an indirect branch instruction corresponds to a subroutine call and, if so, to update the link status structure with the next address.

FIG. 4B is a second embodiment of the IsCall logic circuit 401 which may be suitably employed in FIG. 1. The comparator 440 and its inputs and the output of the IsCall logic circuit 401 are the same as those depicted in FIG. 4A. The output of comparator 440 feeds, as input, to AND gate 455. AND gate 455 also receives as input is Branch signal 430. The is Branch signal 430 is active when the current instruction being processed by the pipe stage coupled to the IsCall logic circuit 401 is a branch instruction. In operation, if the current instruction is a branch instruction and the next address after the branch instruction equals the address contained in the link register, output signal 425 is utilized to associate an is Callflag with this branch instruction in the branch prediction circuit 132 and the link status structure 134 is updated with the next address. This second embodiment allows the branch and link instruction to be processed in a conventional manner outside of the IsCall logic circuit 401.

Figure 5:
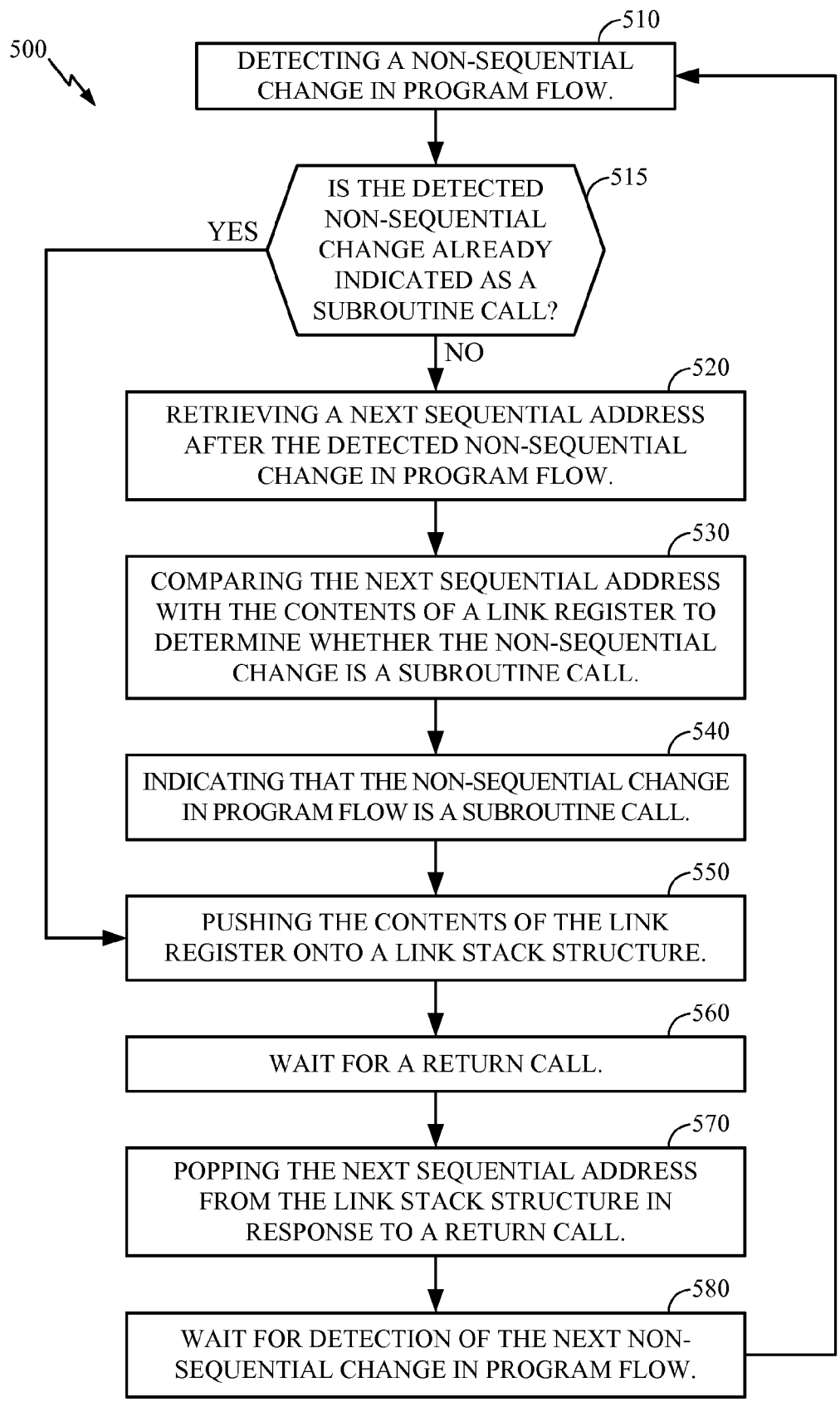
FIG. 5 is a flow chart illustrating a method of recognizing a subroutine call.

FIG. 5 is a flow chart illustrating a method 500 of recognizing a subroutine. At block 510, a non-sequential change in program flow is detected. For example, a branch instruction. More specifically, a branch instruction that is not a branch and link instruction is detected. Such detection can be performed by known decoding techniques. At block 515, the method 500 determines whether the detected non-sequential change in program flow has already been indicated as a subroutine call. By way of example, if the branch instruction has already been processed by pipeline 105, an isCallFlag would be set in the branch prediction circuit 132 indicating that the presently processed branch instruction has been indicated or marked as a subroutine call. If it has, the method 500 has processed this non-sequential change in program flow before and, thus, proceeds to block 550.

If the detected non-sequential change in program flow has not been previously indicated as a subroutine call, the method 500 proceeds to block 520. At block 520, the next sequential address after the detected non-sequential change in program flow is retrieved. For example, the next address after the branch instruction. The next address may be provided by various means including a preceding pipe stage, a next program counter (PC) generation circuit in the IFU stage 102, or the like. At block 530, the next sequential address is compared with the contents of a link register. As discussed above in connection with FIG. 2, the link register (LR) is assigned the return address in anticipation of a subroutine call. At block 540, the detected non-sequential change in program flow is indicated as a subroutine call. For example, a flag associated with a branch instruction may be set and stored in the branch prediction circuit 132. The method 500 then proceeds to block 550.

At block 550, the contents of the link register is pushed on to a link stack structure. For example, when a branch instruction is executed as illustrated in FIG. 2, the link register is copied to the link stack structure. Equivalently, the next sequential address may be alternatively pushed on to the link stack structure. Although not illustrated, the non-sequential change in program flow causes a subroutine to be processed by the pipeline. At block 560, the method 500 waits for a return call indicating the end of the subroutine. Once a return call is recognized, the method 500 proceeds to block 570 where the next sequential address from the link stack structure is popped. Block 570 allows a processor to redirect the processing of a pipeline to begin processing the instructions at the address of the return call.

The method 500 proceeds to wait block 580 which waits for the next non-sequential change in program flow. Once the next non-sequential change in program flow arrives in a pipeline, the method 500 proceeds to block 510 and then to block 515. If the next non-sequential change in program flow has been previously detected, the non-sequential change in program flow will have been already indicate, thus, block 515 will proceed to block 550.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of embodiments, it will be recognized that a wide variety of implementations may be employed by persons of ordinary skill in the art consistent with the above discussion and the claims which follow below.

What is claimed is:

1. A method of recognizing a subroutine call, comprising:
   detecting a non-sequential change in program flow;
   retrieving a next sequential address after the detected non-sequential change in program flow; and
   comparing the next sequential address with the contents of a register to determine whether the non-sequential change is a subroutine call.

2. The method of claim 1 wherein the non-sequential change in program flow is a branch instruction.

3. The method of claim 1 wherein the register is a link register.

4. The method of claim 1 further comprising:
   pushing the next sequential address after the non-sequential change in program flow on to a link stack structure.

5. The method of claim 1 further comprising:
   indicating that the non-sequential change in program flow is a subroutine call.

6. The method of claim 5 wherein indicating that the non-sequential change in program flow is a subroutine call comprises:
   storing a flag in a branch prediction circuit associated with the non-sequential change in program flow.

7. An apparatus in a processor for recognizing a subroutine call comprising:
   a circuit comprising:
   a first input for receiving contents of a register;
   a second input for receiving a non-sequential change in program flow;
   a third input for receiving the next sequential address after the non-sequential change in program flow wherein the circuit is configured to compare the next sequential address and the contents of the register to determine whether the non-sequential change in program flow is a subroutine call.

8. The apparatus of claim 7 wherein the non-sequential change in program flow is a branch instruction.

9. The apparatus of claim 7 wherein the register is a link register.

10. The apparatus of claim 7 further comprising:
    a link stack structure wherein the apparatus is configured to push the next sequential address after the non-sequential change in program flow on to the link stack structure.

11. The apparatus of claim 7 further comprising:
    a branch prediction circuit configured to store an indication that the non-sequential change in program flow is a subroutine call.

12. An apparatus for recognizing a subroutine call comprising:
    means for detecting a non-sequential change in program flow;
    means for retrieving a next sequential address after the detected non-sequential change in program flow; and
    means for comparing the next sequential address with the contents of a register to determine whether the non-sequential change is a subroutine call.

13. The apparatus of claim 12 wherein the non-sequential change in program flow is a branch instruction.

14. The apparatus of claim 12 wherein the register is a link register.

15. The apparatus of claim 12 further comprising:
    means for pushing the next sequential address after the non-sequential change in program flow on to a link stack structure.

16. The apparatus of claim 12 further comprising:
    means for indicating that the non-sequential change in program flow is a subroutine call.

17. The apparatus of claim 12 wherein the means for indicating that the non-sequential change in program flow is a subroutine call comprises:
    means for storing a flag in a branch prediction circuit associated with the non-sequential change in program flow.

18. An apparatus for recognizing a subroutine call, comprising:
    a processor pipeline for processing instructions; and
    a circuit coupled to the processor pipeline, the circuit configured to receive contents of a register, an indication of a non-sequential change in program flow, and the next sequential address after the indication of the non-sequential change in program flow, the circuit configured to compare the contents of the link register with the next sequential address to determine whether the indication of a non-sequential change in program flow is a subroutine call.

19. The apparatus of claim 18 further comprising:
    a link stack structure wherein the circuit is configured to push the contents of the link register on to the link stack structure.

20. The apparatus of claim 18 further comprising:
    a branch prediction circuit, wherein the circuit is configured to store an indication that the non-sequential change in program flow is a subroutine call.

* * * * *